United States Patent
Oestereicher

[15] 3,643,722
[45] Feb. 22, 1972

[54] SELF-LOCKING THREADED FASTENERS

[72] Inventor: Louis Oestereicher, Teaneck, N.J.
[73] Assignee: Parker-Kalon Corporation, Clifton, N.J.
[22] Filed: May 16, 1969
[21] Appl. No.: 825,334

[52] U.S. Cl. ................................151/22, 85/46
[51] Int. Cl. ...........................................F16b 39/30
[58] Field of Search ....................151/22; 85/46, 47, 41

[56] References Cited

UNITED STATES PATENTS

| | | | |
|---|---|---|---|
| 1,367,168 | 2/1921 | Stanford | 151/22 |
| 2,278,411 | 4/1942 | Brandel | 151/22 |
| 2,581,690 | 1/1952 | Moehle et al. | 151/22 |
| 2,679,774 | 6/1954 | MacDonald | 151/22 |
| 3,186,464 | 6/1965 | Baumle | 151/22 |
| 3,249,142 | 5/1966 | Phipard | 151/22 |
| 3,426,642 | 2/1969 | Phipard | 151/22 |
| 3,426,820 | 2/1969 | Phipard | 151/22 |
| 3,454,070 | 7/1969 | Phipard | 151/22 |
| 2,352,982 | 7/1944 | Tomalis | 151/22 |

FOREIGN PATENTS OR APPLICATIONS 957,675   4/1964   Great Britain..............................85/46

Primary Examiner—Marion Parsons, Jr.
Attorney—W. Bigelow Hall, Richard A. Wise and Richard B. Megley

[57] ABSTRACT

A self-locking threaded fastener adapted for assembly with a member in which a standard internal thread is formed either by the fastener or a conventional tap. A thread is carried on the shank of the fastener having an included thread angle less than the standard included thread angle, a major diameter greater than is standard for the particular fastener size, and a root width less than is standard. At least one locking lobe is formed on the thread which lobe is engaged by material displaced by the thread whereby to effect locking.

12 Claims, 6 Drawing Figures

Inventor
Louis Oestereicher
By his Attorney
Richard B. Megley

SELF-LOCKING THREADED FASTENERS

BACKGROUND OF THE INVENTION

This invention relates to self-locking threaded fasteners and more particularly to such fasteners in which the locking action is obtained by the combination of a plurality of lobes on a shank portion of the fastener and a unique or nonstandard thread construction.

A variety of self-locking threaded fasteners have appeared in the market place in recent years. Each of these fasteners have had deficiencies which have restricted their universal utilization. Self-locking fasteners which employ plastic elements to effect locking are expensive to manufacture and cannot be used in applications involving high temperature. When special thread formations were used in the past, the resulting self-locking fasteners were again found to have high manufacturing costs in addition to high installation torque and low reliability when subjected to vibration.

The features of the invention, together with various novel details of construction, will now be more particularly described with reference to the accompanying drawings and pointed out in the claims. It is to be understood that the particular embodiments of the invention shown in the drawings are for illustration purposes only and are not to be construed as a limitation of the invention. It is also to be clearly understood that the features of this invention may be used on any threaded fastener including bolts as well as screws.

DRAWING DESCRIPTION

DESCRIPTION OF THE PREFERRED EMBODIMENTS

Figure 1:
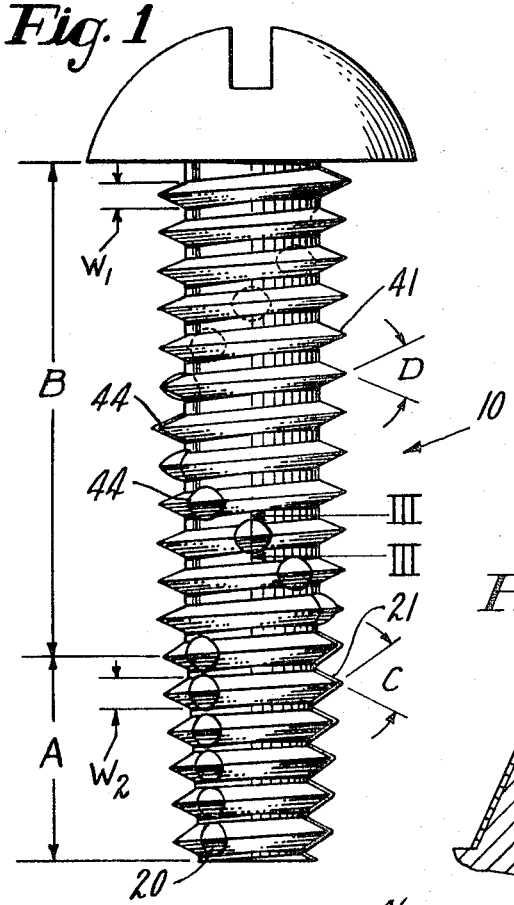
FIG. 1 is a side elevation of a metal screw embodying features of this invention.

A preferred embodiment of a screw 10 illustrating the invention is shown in FIG. 1. The screw 10 has a forward, tapered pilot end A and a shank B. The locus of this invention resides in the construction of the threaded shank portion B of the screw 10 per se and in the use of this construction in combination with a pilot end A as shown and to be described. The pilot end A has a plurality of thread-swaging lobes 20 for swaging or tapping a standard internal thread in a member into which the screw 10 is to be inserted. The pilot end A is shown and described primarily to facilitate a complete description of the utility and broad usage of the present invention. It is to be clearly understood, however, that the novel features of this invention are not limited to use on a screw having a pilot end such as shown in FIG. 1. On the contrary, the pilot end A may be eliminated and a conventional tapping tool such as described in U.S. Pat. No. 2,991,491, issued July 11, 1969, in the name of D. P. Welles, Jr., may be used to form a standard internal thread in a member into which a screw embodying the present invention is to be inserted. The swaging lobes 20 of the pilot end A may be of a construction such as described in U.S. Pat. No. 3,426,642, issued Feb. 11, 1969 in the name of H. F. Phipard, Jr. or of any other convenient construction capable of tapping a hole.

Figure 6:
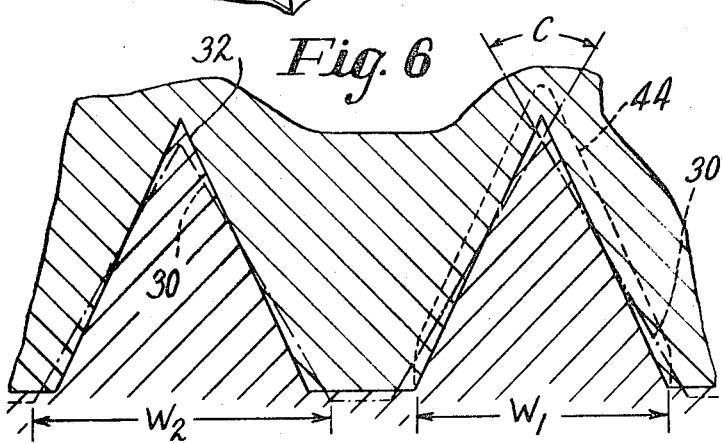
FIG. 6 is a sectional view, on an enlarged scale, illustrating the swaging action of the threaded shank portion of the screw illustrated in FIG. 1.

Conventional or standard threads have an included thread angle of 60°. The rearmost thread 21 on the pilot end A of the screw 10 has an included thread angle C of 60° and therefore will swage an internal thread having a standard included thread angle. Further, the other dimensions of the rearmost thread 21 on the pilot end A are such that a standard internal thread will be formed thereby. A standard internal thread such as would be swaged by the pilot A or formed by conventional tapping tools is shown in FIG. 6 and identified by the reference character 30. A fuller appreciation of the function or effect of the lobes 20 on the pilot end may be obtained by reference to the above-cited U.S. Pat. No. 3,426,642.

The threads on the shank portion B have an included thread angle D, in the preferred embodiment, of approximately 35° to 55°. The major or outside diameter of the threaded shank is 5 to 15 percent greater than the major diameter of the standard thread conventionally used for a given screw size. Thus, the outside or major diameter of the thread 41, for example, is 5 to 15 percent greater than the outside or major diameter of the thread 21. Further, as clearly illustrated in FIGS. 1 and 6, the width of the threads at the root ($W_1$) in the shank portion B is smaller than the root width of a standard thread $W_2$. Compare $W_1$ and $W_2$ in FIG. 6. Thus, when the threaded shank portion B is inserted into a conventionally tapped hole such as would be swaged by the pilot end A, the threads on the shank portion B swage a deeper and sharper or more pointed internal thread than was formed by the pilot end or tap. That is, the outer portion of the shank threads swage a slightly more elongated or enlarged internal thread. The result is that material is swaged or forced toward the root of the thread. The relative size and shape of the thread on the shank portion B compared to those of a standard internal thread are such that little appreciable increase in required driving torque results.

In the illustrated preferred embodiment, the threaded shank portion B also has a root diameter 5 to 15 percent greater than the root diameter of the standard thread conventionally used for a given screw size. Thus, metal is forced from the crest of the standard internal thread outwardly along and into engagement with the flanks of the threads on the shank portion B. Again, due to the small magnitude of the size differential, no appreciable increase in required driving torque results.

A comparison of the thread form on the shank portion B with a conventional thread may be obtained by comparing the thread outline 32 which is that formed by the shank portion B with a standard thread outline 30, see FIG. 6.

Figure 2:
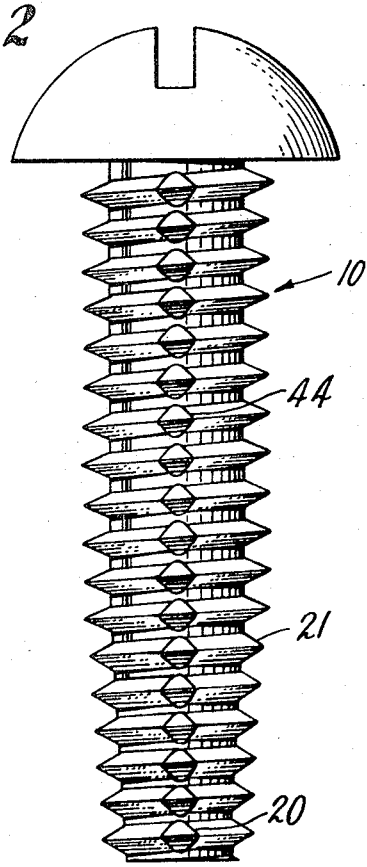
FIG. 2 is a view similar to FIG. 1 of a metal screw illustrating an alternate embodiment of this invention.
Figure 3:
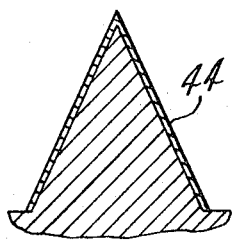
FIG. 3 is an enlarged fragmentary longitudinal sectional view taken approximately along lines III—III of FIG. 1.

A plurality of locking lobes 44 are formed at spaced locations on the threaded shank portion B. The locking lobes 44 are disposed in a spiral pattern on the shank portion B in the preferred embodiment as illustrated in FIG. 1. The specific angle of the spiral may be varied for various diameters and lengths of screws. The locking lobes 44 are disposed in a straight line in the alternate embodiment shown in FIG. 2. The number and disposition of lobes is determined by the requirements of the particular application.

Figure 4:
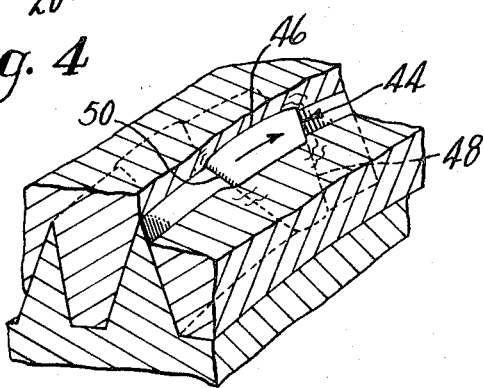
FIG. 4 is a fragmentary perspective view, on an enlarged scale, illustrating the relationship of the threads on the shank portion of the screw shown in FIG. 1 with standard internal threads in a member into which said screw is inserted.
Figure 5:
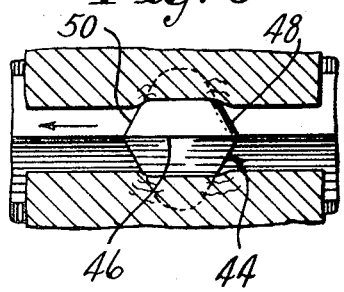
FIG. 5 is a fragmentary plan view on an enlarged scale of one of the thread sections shown in FIG. 4.

As best shown in FIGS. 4 and 5, the locking lobes are preferably of a substantially triangular configuration. That is, the crest 46 of each of the locking lobes 44 is relatively elongated and the edges 48, 50 of the lobes on the thread flank converge from a maximum spacing at the crest of the thread to a minimum spacing at the root of the thread. The leading end of the crest of the lobe 44, in the preferred embodiment, rises outwardly from the crest of the associated thread and the trailing end of the lobe crest falls back into the associated thread in a substantially arcuate configuration. The essentially triangular portion of the lobe on the flank of the associated thread is preferably of bulbous configuration in transverse cross section taken along the thread flank. As will be discussed, this preferred locking lobe configuration facilitates the flow of swaged metal into locking position relative to the locking lobe 44 when the shank portion B is inserted.

When the shank portion B is inserted into a member having a standard, appropriately sized, internal thread, the outer portion or sharp crest of the shank threads, e.g., 41, will swage metal downwardly along the flanks of the thread. The displaced metal will also be curved around the locking lobes whereby the lobes become surrounded by displaced material. The screw will thus become locked in position upon completion of the insertion operation. The arcuate lobe crest 46 penetrates or swages additional material into locking position.

The essentially triangular configuration of the locking lobes 44 facilitates the flow of displaced metal from the crest of the thread along the edges 48, 50 of the lobe. That is, this particular configuration provides a minimum resistance to the flow of displaced metal into a locking relationship with respect to the locking lobes. Displaced metal is urged into blocking or locking position along the edge 50 of the lobe as a result of the taper thereof. However, this configuration does not result in excessive binding or build up of material at the root area and thereby avoids the increase in driving torque which would result if this occurred.

In the preferred embodiment, metal is also urged into locking position relative to the locking lobes 44 as a result of the oversized root diameter of the threaded shank portion B. A properly designed or sized shank thread will result in the locking lobes 44 being completely surrounded by displaced metal. Additionally, proper design or sizing will result in essentially complete engagement of the flanks of the threads on the shank portion B with the reformed internal thread.

Thus, applicant has provided a locking thread capable of securely locking a screw or bolt in a fixed position. An extremely high resistance to vibration is also attained. As noted above, the construction is applicable to any threaded fastener. If preferred, the size of the internal thread formed by the pilot end A may be less than the standard thread size to effect additional material displaced by the thread shank portion B. The particular included thread angle, major diameter, width of the thread at the root, and root diameter of the thread shank portion B may be varied depending on the desired driving torque and resistance to removal. Also, the number, size and shape of the locking lobes may be varied depending on the amount of locking action desired.

Having thus described a preferred embodiment of my invention, what I claim as new and desire to secure by Letters Patent of the United States is:

1. A self-locking threaded fastener adapted for assembly with a member in which a standard internal thread is formed comprising a shank of substantially circular cross section having a circular helical thread carried thereon, said helical thread having a root, flanks, and a crest defining an included thread angle less than the standard included thread angle and having a major diameter substantially constant and greater than the standard major diameter for the particular fastener size, and at least one locking lobe superimposed on said thread extending along edges outwardly beyond said flanks and having a lobe crest extending beyond the major diameter of said thread, said edges of said lobe converging from a maximum spacing at said lobe crest toward the root of said thread whereby material displaced by said thread during insertion of said fastener into the internally threaded member is urged into locking engagement with said locking lobe.

2. A self-locking threaded fastener according to claim 1 wherein the included thread angle of the thread carried by the shank is 35° to 55°.

3. A self-locking threaded fastener according to claim 1 wherein the major diameter of the thread carried by the shank is 5 to 15 percent greater than the standard major diameter for the particular fastener size.

4. A self-locking threaded fastener according to claim 1 wherein the root width of the thread carried by the shank is less than the standard root width for the particular fastener size.

5. A self-locking threaded fastener according to claim 4 wherein the included thread angle of the thread carried by the shank is approximately 35 to 55 degrees and the major diameter thereof is 5 to 15 percent greater than the standard major diameter for the particular fastener size.

6. A self-locking threaded fastener according to claim 1 wherein said locking lobe has a substantially bulbous transverse cross section on the flanks of the thread.

7. A self-locking threaded fastener according to claim 6 wherein said locking lobe is of essentially triangular configuration on the flanks of the thread having a maximum width at the crest of the thread and the sides thereof converging to a minimum spacing substantially at the root of the thread.

8. A self-locking thread-forming fastener having a substantially cylindrical shank portion and a tapered pilot end, said tapered pilot end having a helical thread carried thereon and a plurality of circumferentially spaced discrete thread-forming lobes expressed from the flanks of said pilot end thread, the thread-forming lobe nearest said shank portion having a configuration adapted to swage a substantially standard internal thread in a generally cylindrical surface, said substantially cylindrical shank portion having a substantially circular helical thread carried thereon, said shank thread having a root, flanks, and a crest, defining an included thread angle less than the standard included thread angle and having a major diameter substantially constant and greater than the standard major diameter for the particular fastener size, and at least one locking lobe superimposed on said shank thread extending along edges outwardly beyond said flanks and having a lobe crest extending beyond the major diameter of said thread, said edges of said lobe converging from a maximum spacing at said lobe crest toward the root of said thread whereby material displaced by said shank thread during insertion of said fastener is urged into locking engagement with said locking lobe.

9. A self-locking thread-forming fastener according to claim 8 wherein the root width of the thread carried by the shank portion is less than the standard root width for the particular fastener size.

10. A self-locking thread-forming fastener according to claim 8 wherein the included thread angle of the thread carried by the shank portion is approximately 35° to 55° and the major diameter thereof is 5 to 15 percent greater than the standard major diameter for the particular fastener size.

11. A self-locking thread-forming fastener according to claim 8 wherein said locking lobe has a substantially bulbous transverse cross section on the flanks of the shank thread.

12. A self-locking thread-forming fastener according to claim 8 wherein said locking lobe is of essentially triangular configuration on the flanks of the shank thread having a maximum width at the crest of the shank thread and the sides thereof converging to a minimum spacing substantially at the root of the shank thread.

* * * * *